US008979044B2

(12) United States Patent
Seidl et al.

(10) Patent No.: US 8,979,044 B2
(45) Date of Patent: Mar. 17, 2015

(54) MAGNETIC HOLD DEVICES AND SYSTEMS

(75) Inventors: Kenneth G. Seidl, Port Washington, WI (US); Edward Nowak, West Bend, WI (US); Michael Burwell, Cedarburg, WI (US); Paul Li, Milwaukee, WI (US); Paul Stangl, West Bend, WI (US)

(73) Assignee: Raffel Systems, LLC, Germantown, WI (US)

( * ) Notice: Subject to any disclaimer, the term of this patent is extended or adjusted under 35 U.S.C. 154(b) by 129 days.

(21) Appl. No.: 13/074,803

(22) Filed: Mar. 29, 2011

(65) Prior Publication Data
US 2012/0248268 A1    Oct. 4, 2012

(51) Int. Cl.
| A47B 96/06 | (2006.01) |
| F16M 11/24 | (2006.01) |
| H01F 7/02 | (2006.01) |
| F21V 21/096 | (2006.01) |

(52) U.S. Cl.
CPC ............ *F16M 11/24* (2013.01); *H01F 7/0252* (2013.01); *F21V 21/096* (2013.01)
USPC ...................................................... 248/205.1

(58) Field of Classification Search
USPC ............. 248/441.1, 444, 447, 454, 458, 132, 248/133, 136, 371, 372.1, 404, 157, 917, 248/206.5, 309.4, 295.11, 919, 922, 923, 248/918, 348, 825, 827, 205.1, 200.1, 200, 248/213.2
See application file for complete search history.

(56) References Cited

U.S. PATENT DOCUMENTS

| 5,072,345 | A  | * | 12/1991 | Goggia ...................... 362/153.1 |
| 5,609,317 | A  | * | 3/1997 | Glynn et al. ............... 248/206.5 |
| 6,042,080 | A  | * | 3/2000 | Shepherd et al. ............. 248/683 |
| 6,180,928 | B1 | * | 1/2001 | Garrigus ...................... 219/491 |
| 7,131,616 | B2 | * | 11/2006 | Livingstone .................. 248/304 |
| 7,618,013 | B2 | * | 11/2009 | Elmer et al. ............... 248/309.4 |
| 7,637,226 | B1 | * | 12/2009 | Bradley ...................... 116/28 R |
| 7,669,810 | B2 | * | 3/2010 | Chiang et al. ................. 248/131 |
| 7,762,515 | B2 | * | 7/2010 | Lin ................................ 248/447 |
| 8,020,816 | B2 | * | 9/2011 | Laitila et al. ............... 248/125.7 |
| 8,181,924 | B2 | * | 5/2012 | Pepe .......................... 248/206.5 |
| 8,205,846 | B2 | * | 6/2012 | Glunk ........................ 248/309.4 |
| 2005/0109899 | A1 | * | 5/2005 | Yeh ............................. 248/205.5 |
| 2005/0151043 | A1 | * | 7/2005 | Kim et al. ................... 248/274.1 |
| 2008/0258021 | A1 | * | 10/2008 | Etzkorn et al. ............... 248/157 |
| 2009/0302181 | A1 | * | 12/2009 | Glunk ........................ 248/206.5 |
| 2010/0237206 | A1 | * | 9/2010 | Barker ........................ 248/206.5 |
| 2011/0089310 | A1 | * | 4/2011 | Heintz .......................... 248/677 |
| 2011/0133044 | A1 | * | 6/2011 | Pepe .......................... 248/206.5 |
| 2011/0226297 | A1 | * | 9/2011 | Rewis ......................... 135/88.05 |
| 2012/0081670 | A1 | * | 4/2012 | Greaves et al. ............... 352/243 |
| 2012/0181979 | A1 | * | 7/2012 | Hudspeth et al. ............. 320/108 |

* cited by examiner

*Primary Examiner* — Monica Millner
(74) *Attorney, Agent, or Firm* — Tyler J. Sisk; Casimir Jones, S.C.

(57) ABSTRACT

The invention provides compositions and methods for holding systems, devices, apparatuses, or portions thereof in a retracted, extended, or intermediate configuration. In particular, the invention provides permanent magnets and/or magnetizable materials configured to hold systems, devices, apparatuses, or portions thereof in retracted, extended, and/or intermediate configurations.

14 Claims, 3 Drawing Sheets

Figure 3

MAGNETIC HOLD DEVICES AND SYSTEMS

FIELD OF THE INVENTION

The invention provides compositions and methods for holding systems, devices, apparatuses, or portions thereof in a retracted, extended, or intermediate configuration. In particular, the invention provides permanent magnets and/or magnetizable materials configured to hold systems, devices, apparatuses, or portions thereof in retracted, extended, and/or intermediate configurations.

BACKGROUND

A variety of installed lighting applications involve lights which are extendable and retractable. Lighting may be installed in furniture, seating, seating arrangements, cars, boats, medical equipment, etc. Various mechanical mechanisms exist for positioning lights at various degrees of extension (e.g., springs, friction elements, locking assemblies, etc.). Unfortunately, these mechanisms can be cumbersome, and due to their reliance on mechanical devices, they wear out or become non-functional over time. Further, mechanical hold devices tend to be limited in the number, or variety of positions in which they can hold an extendable light.

SUMMARY OF THE INVENTION

The invention provides compositions and methods for holding systems, devices, apparatuses, or portions thereof in a retracted, extended, or intermediate configuration. In particular, the invention provides permanent magnets and/or magnetizable materials configured to hold systems, devices, apparatuses, or portions thereof in retracted, extended, and/or intermediate configurations.

In some embodiments, the invention provides an apparatus comprising: (a) a housing, wherein the housing comprises one or more permanent magnets; (b) a support element, wherein the support element has an elongate shape comprising proximal and distal ends, wherein the support element is capable of extending from and retracting into or through the housing, and wherein the support element comprises a ferromagnetic material; and (c) a functional element connected to the distal end of the support element; wherein upon alignment of the ferromagnetic material of the support element with the one or more permanent magnets of the housing, the support element is held at a fixed degree of extendedness from the housing. The invention is not limited by the orientation of the proximate and distal ends of the support element. For example, in some embodiments, the proximate and distal ends are relative to the functional element (e.g., the proximate end is the end of the support element that is closest to the functional element whereas the distal end is the end that is furthest from the functional element). In some embodiments, the proximate and distal ends are relative to the housing (e.g., the proximate end is the end of the support element that is closest to the housing (e.g., when the support element is fully extended from and/or through the housing) whereas the distal end is the end that is furthest from the housing (e.g., when the support element is fully extended from and/or through the housing)). In some embodiments, the ferromagnetic material comprises a magnetizable material. In some embodiments, the ferromagnetic and/or magnetizable material is located at discrete locations (e.g., 2, 3, 4, 5, 6, 7, 8, 9, 10 . . . 20 . . . 50, or more locations) along the length of the support element. In some embodiments, the ferromagnetic and/or magnetizable material is continuous along the length of the support element. In some embodiments, the support element is comprised of the ferromagnetic and/or magnetizable material. The invention is not limited by the type of functional element that is part of the apparatus. Indeed, a variety of functional elements may be used including, but not limited to, a light or light fixture (e.g., reading light), air freshener, speaker, microphone, mirror, device holder (e.g., phone holder, IPOD holder, IPAD holder, MP3 player holder, etc.), remote control, picture frame, drink holder, book holder, fan holder, notepad holder, etc. In some embodiments, the support element comprises an electrical connection between the functional element and a power source. In some embodiments, the housing comprises a free-standing base. In some embodiments, the housing is configured for mounting on and/or in an object (e.g., for mounting the apparatus on and/or in an object). The invention is not limited by the type of object to which the housing and/or apparatus can be mounted on and/or within. The housing and/or apparatus can be mounted to a variety of objects including, but not limited to, furniture, theater seating, conference seating, a wheelchair, a desk, a hospital bed, a wall, a car (e.g., a console or other part of the car), an ambulance, an ambulance cot, a boat, a plane, a train, medical equipment or other object. In some embodiments, the housing is configured for mounting the apparatus into the arm rest, back rest, side, top, or console of a seating element. A variety of seating elements may be used including, but not limited to, a lounge chair, theater seating, a vehicle seat, a hospital bed, wheelchair, ambulance or ambulance cot, a couch or other object used as a seat. In some embodiments, fully retracting the support element into or through the housing places the functional element within or adjacent to the housing. In some embodiments, the support element comprises one or more permanent magnets at one of its ends wherein the one or more permanent magnets interact with the housing (e.g., with the one or more permanent magnets residing within the housing) to hold the support element in either a fully retracted or fully extended configuration. In some embodiments, the support element comprises one or more permanent magnets between the proximal end and the distal end that interact with the one or more housing magnets to hold the support element in discrete partially extended or retracted configuration (e.g., wherein moving the support element from the partially extended or retracted configuration requires more force (e.g., due to the magnet-magnet interaction) to move to a more extended or retracted position than in the absence of the one or more permanent magnets between the proximal end and the distal end. In some embodiments, the support element is flexible, bendable, rotatable, or a combination thereof. In a preferred embodiment, the force resulting from alignment of the permanent magnets of the housing with the magnetizable material of the support element is sufficient to resist the pull of gravity on the support element and the functional element. In further preferred embodiment, the force is sufficient to resist forces caused by minor disturbances. In some embodiments, the magnetic interaction is easily overcome by a user of low to average strength. In some embodiments, the magnetic interaction is overcome by a force of 5-100 newtons applied to the support element. The invention is not limited by the amount of force that is required to move the support element (e.g., into, out of, or through the housing). For example, permanent magnets of a selected strength and/or a select ferromagnetic material for the support element may be used that create the desired strength of interaction between the magnet(s) and support element that in turn define the amount of force required to move the support element (e.g., into, out of, or through the housing). Thus, the force may be less than 5 newtons or greater than 100 newtons depending on the material and/or magnets chosen. In some embodiments, upon alignment of the ferromagnetic material of the support element with the one or more housing magnets, the support element is held at a fixed degree of extendedness from the housing.

In some embodiments, the invention provides an apparatus comprising: (a) a housing comprising one or more housing magnets; (b) a support element, wherein the support element has an elongate shape comprising proximal and distal ends, wherein the support element is capable of extending from and retracting into the housing, and wherein the support element comprises one or more support-element magnets along the length of the support element; and (c) a functional element connected to the distal end of the support element; wherein, upon alignment of one of the support-element magnets with the one or more housing magnets, the support element is held at a fixed degree of extendedness from the housing. The invention is not limited by the type of functional element connected to the support element. Indeed, a variety of functional elements may be part of the apparatus including, but not limited to, a light or light fixture (e.g., reading light), air freshener, speaker, microphone, mirror, device holder (e.g., phone holder, IPOD holder, IPAD holder, MP3 player holder, etc.), remote control, picture frame, drink holder, book holder, fan holder, notepad holder, etc. In some embodiments, the functional element is a light-emitting element. In some embodiments, the support element further comprises an electrical connection between the functional element and a power source. In some embodiments, the housing comprises a freestanding base. In some embodiments, the housing is configured for mounting the apparatus on and/or in an object. The invention is not limited by the nature of the object. Indeed, any object onto which and/or into which a housing can be mounted may be used, including, but not limited to, furniture, seating or seating arrangement, console (e.g., center console in a vehicle), a wall, a vehicle, or medical equipment. In some embodiments, the housing is configured for mounting the apparatus into the arm rest, back rest, side, top, or console of a seating element. In some embodiments, the seating element is selected from a lounge chair, theater seating, a vehicle seat, a hospital bed, wheelchair or other patient transport device (e.g., ambulance cot), or a couch. In some embodiments, fully retracting the support element into the housing places the functional element within or adjacent to the housing. In some embodiments, the support element comprises one or more magnets on or adjacent to the distal end that are capable of interacting with the one or more housing magnets to hold the support element in a fully retracted configuration. In some embodiments, the support element comprises one or more magnets at or adjacent to the proximal end that are capable of interacting with the housing magnets to hold the support element in a fully extended configuration. In some embodiments, the support element comprises one or more magnets between the proximal end and the distal end that are capable of interacting with the housing magnets to hold the support element in any position including fully retracted, fully extended, or any degree of extension/retraction there between. In some embodiments, the support element comprises magnets between the proximal end and the distal end that are capable of interacting with the housing magnets to hold the support element in any position. The invention is not limited by the number of magnets between the proximal and distal ends. Indeed, any number of magnets can be used depending upon the apparatus and uses thereof, including but not limited to: 1, 2, 3, 4, 5, 6, 7, 8, 9, 10, 11, 12, 13, 14, 15, 16, 17, 18, 19, 20, 25, 30, 40, 50, or more magnets. In some embodiments, the support element further comprises one or more support-element magnets near the proximal end and one or more support-element magnets near the distal end. In some embodiments, the support element is flexible, bendable, rotatable, or combinations thereof. In some embodiments, upon alignment of one of the support-element magnets with the one or more housing magnets the resulting magnetic interaction is sufficient to resist the pull of gravity on the support element and the functional element (e.g., thereby holding the support element at a fixed degree of extension/retraction). In some embodiments, the magnetic interaction is further sufficient to resist forces caused by minor disturbances (e.g., inadvertent jostling, motion of a car, etc.). In some embodiments, the degree of magnetic interaction is configured (e.g., using magnets of a certain strength and/or using a specific number of magnets) such that the magnetic interaction is easily overcome by a user of low to average strength (e.g., child, elderly person, healthy person). For example, in some embodiments, the magnetic interaction is overcome by a force of about 5-100 newtons applied to the support element, although the apparatus can be configured to be alterable (e.g., movable) with smaller or larger amounts of force. In some embodiments, the magnetic interaction is overcome by a force of 10-40 newtons applied to the support element.

BRIEF DESCRIPTION OF THE DRAWINGS

The foregoing summary and detailed description is better understood when read in conjunction with the accompanying drawings which are included by way of example and not by way of limitation.

DEFINITIONS

Figure 1:
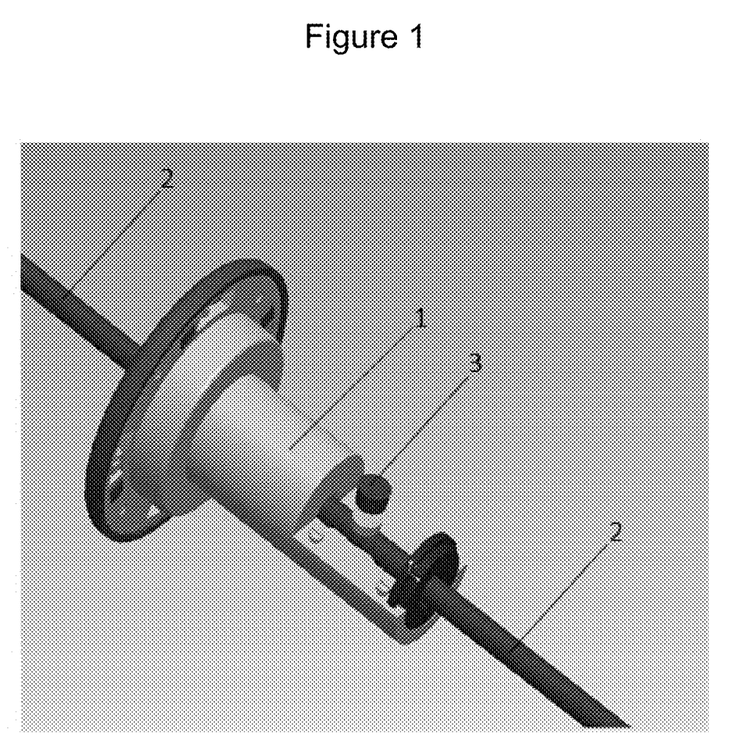
FIG. 1 shows a schematic demonstrating an exemplary placement of a housing magnet 3 within the housing 1 and alongside the support element 2.
Figure 2:
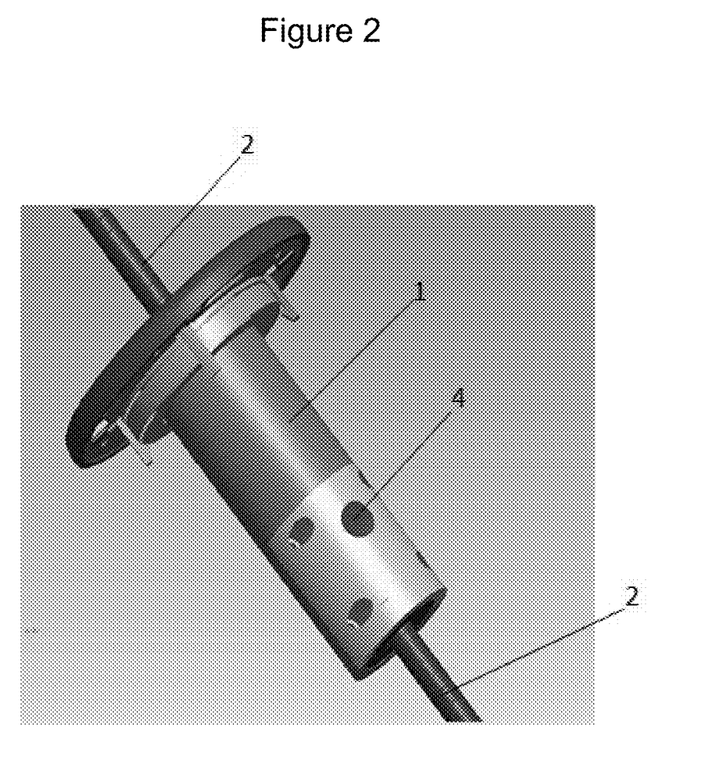
FIG. 2 shows a schematic of an assembled housing 1 with an inset 4 for positioning of a housing magnet alongside the support element 2.
Figure 3:
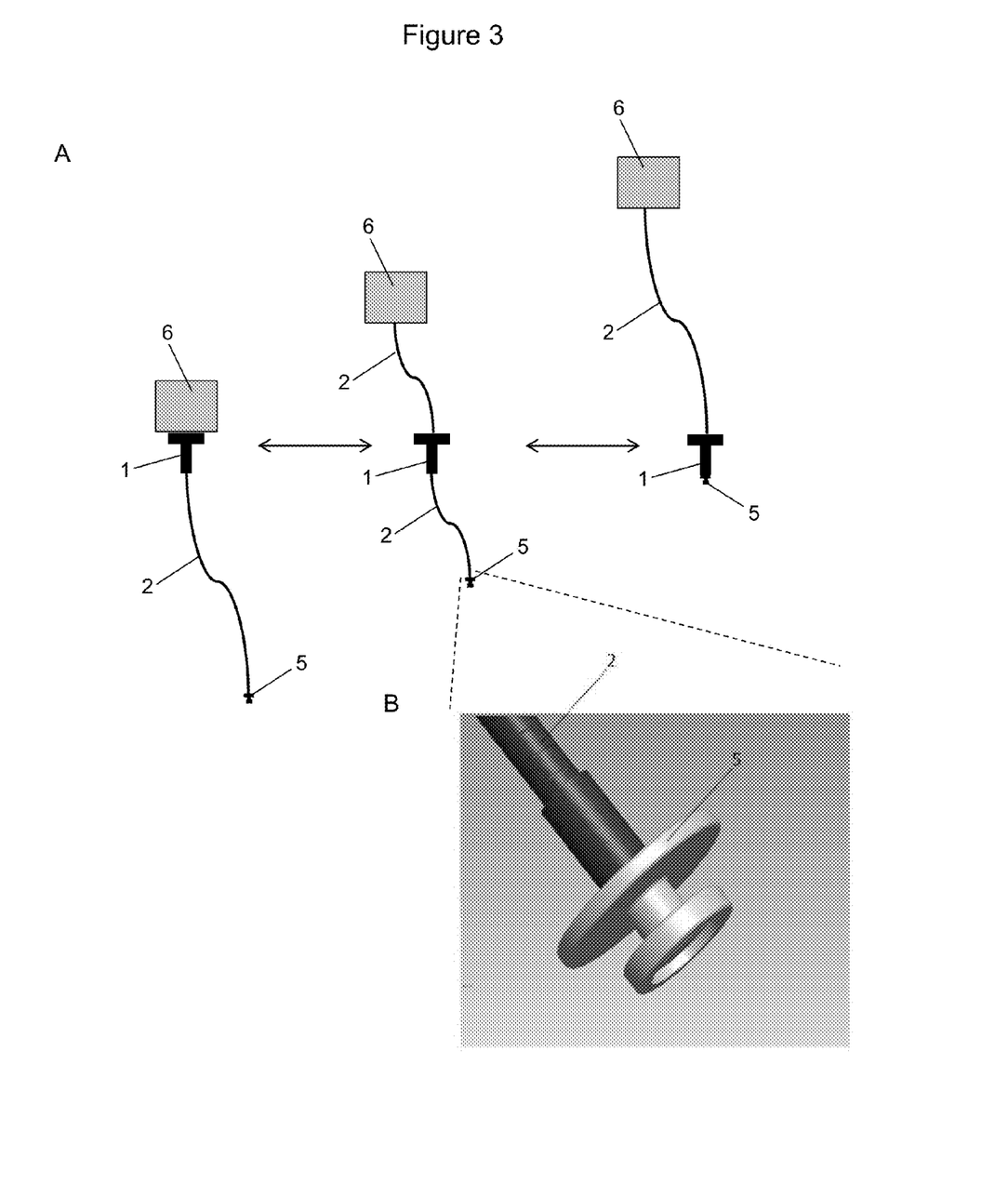
FIG. 3 shows schematics of exemplary embodiments comprising a magnet at the bottom of a support element: (A) an exemplary apparatus comprising a housing 1 comprising a ferromagnetic material, flexible support element 2, magnet located at the proximal end of the support element 5, and functional element 6 moves from a fully retracted position (left) to an intermediate position (middle) and to fully extended position in which the magnet 5 is aligned with the housing 1; (B) a magnified depiction of the proximal end of the support element 2 and magnet 5.

As used herein, the terms "ferromagnetic material," "ferromagnetic substance," or "ferromagnet" refer to compositions, objects, or materials that have magnetic moments with a tendency to become parallelized in the presence of an applied magnetic field, thereby producing a net magnetic field from the composition, object, or material. Some ferromagnetic materials readily retain the parallelized orientation of their magnetic moments when not in the presence of an external magnetic field, and thereby form "permanent magnets." Other ferromagnetic materials are magnetized when placed in a magnetic field, but become unmagnetized when removed from a magnetic field (e.g., over the course of microseconds, seconds, minutes, etc.), and are referred to herein as "magnetizable materials."

As used herein, the terms "magnet" and "permanent magnet" refer to an object made from a material that is magnetized and creates its own persistent magnetic field.

DETAILED DESCRIPTION OF EMBODIMENTS OF THE INVENTION

The invention provides compositions and methods for holding systems, devices, apparatuses, or portions thereof in a retracted, extended, or intermediate configuration. In particular, the invention provides magnets configured to hold installed lighting in retracted, extended, and/or intermediate configurations.

Accordingly, in some embodiments, the invention provides an apparatus (e.g., light fixture or other non-lighting device or apparatus) comprising one or more shafts, necks, and/or support elements. The apparatus is extendable/retractable, raised/lowered, or in some way adjusted, repositioned, and/or configured by extending and retracting one or more support elements. As described herein, support elements are elongate members with a distal end, proximal end, and intermediate region. In some embodiments, support elements are attached to an apparatus, device, and/or functional element on one end (e.g., distal end). In some embodiments, support elements are configured to retract into and/or through, and/or extend from, a base or housing. In some embodiments, the distal end of a support element is within, or adjacent to, the housing when the support element is fully retracted. In some embodiments, the proximal end of a support element is within, or adjacent to, the housing (e.g. within or adjacent to the opening of the housing) when the support element is fully extended. In some embodiments, the intermediate region of a support element is within, or adjacent to, the housing (e.g. within or adjacent to the opening of the housing) when the support element is partially extended or in an intermediate configuration (e.g., partially extended).

In some embodiments, a housing comprises one or more permanent magnets located within the housing (e.g., housing magnets), or adjacent to the opening through which a support element passes. In some embodiments, the one or more support elements each comprise ferromagnetic material (e.g., magnetizable material, permanent magnets, etc.) positioned along its/their length(s) (e.g., located at discrete positions or continuously along the length of the support element). In some embodiments, interaction between the housing magnets and the ferromagnetic material of the support-element (e.g., magnetizable material, permanent magnets, etc.) holds the apparatus at a fixed degree of extendedness (e.g., fully extended, fully retracted, intermediate extendedness), fixed height, fixed position, etc. In some embodiments, as the apparatus is extended or raised, the attractive force between the ferromagnetic material of the support-element (e.g., magnetizable material, permanent magnets, etc.) and housing magnet(s) hold the apparatus in a defined (e.g., user defined) position, height, configuration, or degree of extendedness. In some embodiments, the attractive force between the ferromagnetic material of the support-element (e.g., magnetizable material, permanent magnets, etc.) and housing magnet(s) prevent the support element(s) from sliding back into the housing(s) (or to a fully extended position) upon being placed in a partially extended position (e.g., by a user). In some embodiments, the ferromagnetic material of the support-element is installed within or along the support element(s) at predetermined intervals. In some embodiments, the ferromagnetic material of the support-element (e.g., magnetizable material, permanent magnets, etc.) is placed at desired positions along or within the support element(s). In some embodiments, the ferromagnetic material of the support-element (e.g., magnetizable material, permanent magnets, etc.) is repositional along the support-element(s) to adjust the hold-positions (e.g., degree of extendedness) of the apparatus. In some embodiments, the ferromagnetic material of the support-element is continuous throughout the length of the support element(s). In some embodiments, a support element is constructed of a ferromagnetic material (e.g., magnetizable material).

In a preferred embodiment, the invention provides an apparatus comprising a light, light fixture, and/or light-emitting device as the functional element. In some embodiments, a light fixture comprises a shaft (e.g., flexible shaft) which is retractable into a housing. In some embodiments, the housing is a base, configured to support the light fixture. In some embodiments, a housing is a stand-alone base. In some embodiments, a housing is configured for mounting on, or installation within, an object or apparatus (e.g., seating, wall, furniture, vehicle, hospital bed, etc.). In some embodiments, the shaft of the apparatus comprises a continuous ferromagnetic material (e.g., magnetizable material) along its length. In some embodiments, the shaft of the apparatus comprises ferromagnetic material (e.g., magnetizable material, permanent magnets, etc.) positioned at discrete positions along its length. In some embodiments, the housing comprises one or more magnets located within the housing, or adjacent to the opening in the housing through which the shaft passes. In some embodiments, interaction between the housing magnets and the ferromagnetic material (e.g., magnetizable material, permanent magnets, etc.) of the shaft holds the light at a fixed degree of extendedness (e.g., fully extended, fully retracted, a certain degree of extendedness). In some embodiments, as the light is extended, the attractive force between the ferromagnetic material (e.g., magnetizable material, permanent magnets, etc.) of the shaft and the housing magnet(s) hold the light in a defined (e.g., user defined) position, configuration, or degree of extendedness. In some embodiments, the attractive force between the ferromagnetic material (e.g., magnetizable material, permanent magnets, etc.) of the shaft and housing magnet(s) prevent the light from sliding back into its housing (or to a fully extended position) upon being placed in a partially extended position (e.g., by a user). In some embodiments, the ferromagnetic material (e.g., magnetizable material, permanent magnets, etc.) of the shaft is installed, attached, mounted, integrated, and/or operably connected within or along the shaft (e.g., continuously or at predetermined intervals). In some embodiments, ferromagnetic material (e.g., magnetizable material, permanent magnets, etc.) is placed at desired positions along or within the shaft. In some embodiments, ferromagnetic material (e.g., magnetizable material, permanent magnets, etc.) is repositioned along the shaft to adjust the hold-positions of the light fixture. The light, light fixture, and/or light-emitting device is therefore setable at any degree of extendedness in which the ferromagnetic material (e.g., magnetizable material, permanent magnets, etc.) of the support element is aligned with a housing magnet. For example, in some embodiments the locations of ferromagnetic material (e.g., magnetizable material, permanent magnets, etc.) along the support elements are adjustable such that the position(s) at which an apparatus is maintained is adjustable. In some embodiments, ferromagnetic material (e.g., magnetizable material, permanent magnets, etc.) is widely spaced along a support element (e.g., several (e.g., 2 or 3, or more) locations along the length of a support element; spaced 1, 2, 3, 4, 5, 6, 7, 8, 9, 10, 11, 12 inches apart; spaced every foot along a support element), providing relatively few hold positions. In some embodiments, ferromagnetic material (e.g., magnetizable material, permanent magnets, etc.) is tightly spaced along a support element (e.g., multiple (e.g., 2, 3, 4, 5, 6, 7, 8, or more locations spaced every 0.1 inches, 0.2 inches, 0.5 inches, 1 inch, etc. along the length of a support element), providing many hold positions, and a higher degree of control of extendedness. In some embodiments, ferromagnetic material (e.g., magnetizable material, permanent magnets, etc.) is uniformly spaced along a support element. In some embodiments, ferromagnetic material (e.g., magnetizable material, permanent magnets, etc.) is non-uniformly spaced along a support element (e.g., user-defined positions, ergonomically-determined positions).

In a preferred embodiment, a support element comprises a ferromagnetic material (e.g., magnetizable material) continuously along the length of the support element. In some embodiment, the support element comprises a magnetizable material from its proximal end to its distal end. In some embodiments, a support element is constructed partially or entirely of a magnetizable material (e.g. iron, copper, nickel, steel, etc.). In some embodiments, a support element is constructed partially or entirely of one or more magnetizable materials (e.g. iron, copper, nickel, steel, etc.). In some embodiments, a support element or shaft is metallic, a magnet, or a magnetizable metal. In some embodiments, the inner core of a support element comprises a magnetizable material. In some embodiments, a support element is coated with a non-magnetizable material (e.g., rubber, plastic, polymer, leather, metal, etc.). In some embodiments, a support element comprises one or more magnetizable materials (e.g., continuously along the length of the support element) and one or more non-magnetizable materials.

In some embodiments, because the support element comprises magnetizable material continuously along its length, the housing magnets will hold the support element at any degree of extendedness. In some embodiments, because the support element comprises magnetizable material continuously along its length, the magnetizable material of the support element is always aligned with the housing magnets. In some embodiments, the presence of magnetizable material along the entire length of the support element provides infinite control of the degree of extendedness of the support element and supported device or apparatus.

The invention is not limited to a light, light fixture, and/or light-emitting device as the functional element. Indeed, any apparatus, device, or portion thereof may be used as a functional element. For example, in some embodiments, the functional element is any one or more of a variety of devices and apparatuses, including, but not limited to: device holders (e.g., cup holders, miniature fan, phone holder, remote control holder, mirror (e.g., makeup mirror, rear-view mirror), dental tools, surgical tools, orthopedic traction, and/or any device, apparatus, or portion thereof which benefits from (or would benefit from) being stably held in a position or at a certain degree of extendedness (e.g., a light (e.g., a reading light), air freshener, speaker(s), microphone, mirror, device holder (e.g., PDA, mp3 player (e.g., IPOD), IPAD), remote control, picture frame, note pad, drink holder, book holder, fan, etc.).

In some embodiments, the invention provides an adjustable (e.g., height adjustable), concealable (e.g. within a housing or base), and/or retractable device or apparatus (e.g., light fixture). In some embodiments, the device (e.g. light fixture) is installed, mounted, connected, attached, and/or configured to an object (e.g. piece of furniture (e.g. chair), wall, hospital bed, vehicle, seating, etc.), apparatus, or element. In some embodiments, a device is installed in furniture (e.g. chair, desk, bed, book case, dresser, etc), seating arrangements (e.g. theater seating, conference seating, etc.), medical equipment (e.g., hospital bed, ambulance, medical cart, etc.) and/or a vehicle (e.g. car, truck, boat, plane, train, etc.). In some embodiments, when installed and/or mounted in/on a chair, couch, or other form of seating, a light (or other device) is mounted on the arm rest, head rest, side of chair, console area between seats, etc. In some embodiments, when installed and/or mounted in/on vehicle (e.g. car, truck, boat, plane, train, etc.), a light (or other apparatus) is mounted on the dashboard, overhead, on a console, on a door, on an armrest, along the seat back, etc.

Magnets employed in the present invention (e.g., as housing magnets, support-element magnets, end-stop magnets, etc.) are not limited as to size, shape, and/or magnetic field strength. Indeed, in some embodiments, magnets are of any suitable shape, including but not limited to: cylinder, cube, rectangular, flat, ovular, oblong, elongate, and combinations thereof. In some embodiments, magnets have dimensions (e.g., height width, length, diameter, etc.) between 1 mm and 1 m (e.g., a cylinder with diameter of 5 mm and height of 5 mm; a cube of 1 cm on a side; and elongate cylinder with a diameter of 4 mm and a length of 500 cm; a flat disc of 1 cm diameter and 1 mm height; a 1 cm by 5 mm by 5 mm box; etc.).

In some embodiments, a device (e.g. light) mounted in/on an object is configured to adopt multiple conformations, for example: concealed and exposed, stowed and deployed, retracted and extended, low and high, concealed and revealed, and intermediate conformations therein. In some embodiments, a device or apparatus is configured to adopt multiple intermediate conformations (e.g. partially extended). In some embodiments, a device or apparatus (e.g. light) is configured to adopt discrete intermediate positions. In some embodiments, a device (e.g. light) is configured to adopt any position between fully extended and fully retracted. In some embodiments, a device or apparatus is held in place at discrete positions (e.g., fully extended, fully retracted, intermediate positions) by the interaction between housing magnets and ferromagnetic material of the support-element. In some embodiments, a device or apparatus is prevented from slipping or dislodging from a desired or discrete position (e.g., height) by the interaction between housing magnets and ferromagnetic material of the support-element.

In some embodiments, a support element is capable of rotating, bending, flexing, turning, swiveling, etc. along all or a portion of its length. In some embodiments, the present invention holds a support element at the same height or degree of extendedness, while allowing the support element to be rotated, bent, flexed, turned, swiveled, etc. In some embodiments, a user is able to maintain the degree of extendedness of a support element while otherwise adjusting the position of an apparatus or device supported by the support element.

In some embodiments, a housing comprises one or more housing magnets (e.g., 1, 2, 3, 4, 5, 6, 7, 8, 9, 10, or more). In some embodiments, multiple housing magnets are configured to interact with a single appropriately positioned support-element magnet. In some embodiments, multiple housing magnets are configured to simultaneously interact with multiple appropriately positioned support-element magnets. In some embodiments, two or more housing magnets are of the same or different magnetic field strengths. In some embodiments, a support element comprises one or more support-element magnets (e.g., 1, 2, 3, 4, 5, 6, 7, 8, 9, 10, etc.). In some embodiments, multiple support-element magnets are configured to interact with a single appropriately positioned support-element magnet. In some embodiments, multiple housing magnets are configured to simultaneously interact with multiple appropriately positioned support-element magnets. In some embodiments, a support element comprises one or more permanent magnets at its distal and/or proximal ends. In some embodiments, a support element does not comprise any permanent magnets. In some embodiments, a support element does not comprise any permanent magnets between its proximal and distal ends. In some embodiments, two or more housing magnets are of the same or different magnetic field strengths. In some embodiments, the magnetic field produced by a housing magnet, a support-element magnet, and/or the interaction between a housing magnet and support-element magnet or magnetizable material is between about 1 Gauss (0.0001 Tesla) and 5000 Gauss (0.5 Tesla). In some embodiments, a magnetic field (or combined magnetic field) of magnets of the present invention is: ~1 Gauss, ~2 Gauss, ~5 Gauss, ~10 Gauss, ~20 Gauss, ~50 Gauss, ~100 Gauss, ~200 Gauss, ~500 Gauss, 1000 Gauss, 2000 Gauss, 5000 Gauss, or any strength there between. In some embodiments, a housing magnet of the invention has a magnetic field strength of: about 20 Gauss . . . 50 Gauss . . . 100 Gauss . . . 200 Gauss . . . 500 Gauss . . . 1000 Gauss, or more. In some embodiments, a support-element magnet of the present invention has a magnetic field strength of: about 20 Gauss . . . 50 Gauss . . . 100 Gauss . . . 200 Gauss . . . 500 Gauss . . . 1000 Gauss, etc. In some embodiments, a support-element comprises multiple support-element magnets of the same strength. In some embodiments, a support-element comprises multiple support-element magnets of different strengths. In some embodiments, a support-element comprises no support-element magnets. In some embodiments, the magnetic field (or combined magnetic field) of a housing magnet and magnetizable material of a support-element resists the pull of gravity on the support element and functional element (e.g., light). In some embodiments, the magnetic field (or combined magnetic field) of a housing and magnetizable material of a support-element is of a strength that resists the pull of gravity and random, minor, background, or unintended forces (e.g., a person sitting into a chair, a bumping the object upon which the housing is attached, jostling the functional element, etc.) on the support element and functional element (e.g., light). In some embodiments, the magnetic field (or combined magnetic field) of a housing and magnetizable material of a support-element is overcome by applying a force (e.g., 1N . . . 2N . . . 5N . . . 10N . . . 15N . . . 20N . . . 25N . . . 30N . . . 50N . . . 100N . . . 150N, or more) to the support element. In some embodiments, force is applied to the support element, such that the support element slides through or along the housing. In some embodiments, a force is applied longitudinally along the support element. In some embodiments, a support element is pushed or pulled through the housing. In some embodiments, a user of low to average strength (e.g., a child, an elderly person, a healthy person, etc.) overcomes the magnetic field (or combined magnetic field) of a housing and magnetizable material of a support-element to readjust the height or position by placing a force upon the support element (e.g., a force of about 5-50 N).

In some embodiments, a housing comprises one or more recessed portions or sections (e.g., recesses). In some embodiments, housing recesses are configured to contain one or more housing magnets. In some embodiments, magnets are held into housing recess by glue, a latch, a screw, or any other suitable means. In some embodiments, housing recesses and housing magnets are sized to stably hold the housing magnet within the housing recess.

In some embodiments, the support-element magnets are installed within or along the support element(s). In some embodiments, support-element magnets are permanently or fixedly installed within or along the support element (e.g., within the support element). In some embodiments, support-element magnets are attached to a support element by an attachment mechanism (e.g., clip, latch, glue, etc.). In some embodiments, support-element magnets are removeably attached to a support element. In some embodiments, support-element magnets are removeably, but stably (e.g., capable of intentional repositioning, but resistant to inadvertent movement) attached to a support element (e.g., using screws, bolts, etc.). In some embodiments, support-element magnets are magnetically attached to a support element.

In some embodiments, a permanent magnet or magnetizable material is located at the proximal end of a support element. In some embodiments, a permanent magnet or magnetizable material at the proximal end of a support element is configured to magnetically interact with a permanent magnet or magnetizable material on the housing to provide additional magnetic force to hold the support element in a fully extended position. In some embodiments, a permanent magnet or magnetizable material is located at the distal end of a support element. In some embodiments, a permanent magnet or magnetizable material at the distal end of a support element is configured to magnetically interact with a permanent magnet or magnetizable material on the housing to provide additional magnetic force to hold the support element in a fully retracted position.

In some embodiments, a functional device of the invention is a light, lighting element, light fixture, and/or lighting device. In some embodiments, a light is mounted or installed in/on an object. The present invention is not limited in scope by the type or style of the light, light fixture, bulb, lamp, light component, etc. to be used. In some embodiments, a device, light component, light fixture, etc. comprises one or more light emitting diodes (LEDs), halogen lamps, fluorescent lights, incandescent bulbs, compact fluorescent bulbs, etc. In some embodiments, a light component or fixture comprises a neck suitable for extending and retracting from a mounting object (e.g. furniture, vehicle, etc.). In some embodiments, a fixture comprises a gooseneck, flexible neck, bendable neck, and/or rotatable neck. In some embodiments, a neck comprises a metal or magnetic material that allows for attachment of support-element magnets. In some embodiments, the neck enables any combination of rotation and bending. In some embodiments, the neck enables infinite adjustment of the angle and aim of the lights mounted thereon. In some embodiments, a neck is substantially rigid over its length. In some embodiments, a neck comprises one or more joints (e.g. 1, 2, 3, 4, 5 . . . 10, or more) to allow angular adjustment at specified locations along the length of the neck. In some embodiments, a neck is configured to adopt one or more specified configurations upon extension. In some embodiments, a neck is configured to adopt a curved conformation along all or a portion of its length. In some embodiments, a neck is configured to adopt a straight conformation along all or a portion of its length. In some embodiments, all or a portion of the neck of a light fixture comprises a "flex neck."

In some embodiments, the invention provides a light, or other device, mounted in/on, or installed in/on an object, apparatus, or article of manufacture. In some embodiments, a light is mounted in/on a piece of furniture. In some embodiments, a light (or other device or apparatus) is mounted in/on seating (e.g. chair (e.g. work chair, easy chair, recliner dentist's chair, conference chair, etc.), theater seating, conference seating, stadium seating, etc.) table (e.g. coffee table, work surface, end table, conference table, etc.), couch, shelving, book case, etc. In some embodiments, the invention provides seating (e.g. upholstered chairs and sofas) arrangements specifically designed for theater use, with integrated extendable lighting. In some embodiments, a light (or other device or apparatus) is mounted in any suitable portion of a piece of seating (e.g. couch, chair, theater seating, car seat, etc.)

including, but not limited to: arm rest, head rest, center console, between two seats, within seating, etc. In some embodiments, the invention provides vehicular seating for use in planes, trains, boat, cars, trucks, etc., with integrated extendable lighting (or other devices or apparatuses).

In some embodiments, the housing component of a device or apparatus of the present invention is configured to: (1) contain the functional component of the device or apparatus component when a stowed, retracted, and/or concealed configuration is adopted; (2) allow extension of the functional component from the housing in order to adopt an active, or extended configuration; (3) to comprise the housing magnet, which functions to hold the functional component at a desired height, position, configuration, or degree of extendedness; (4) support the device or apparatus; and/or (5) mount device or apparatus in/on an object (e.g. furniture, chair, etc.), device, and/or apparatus.

The invention is not limited by the means for mounting and/or integrating a device (e.g. light) in/on an object or apparatus (e.g. seating). In some embodiments, a base or housing provides a means for integrating the device (e.g. light) into the apparatus (e.g. seating). Indeed, any means known to one of ordinary skill in the art may be used. In some embodiments, a housing rests within an object or apparatus, with its top opening sitting near the surface of the apparatus or object. In some embodiments, housing sits within the object or apparatus with one end sitting flush (or nearly flush) with the surface of the apparatus or object (e.g. seating). In some embodiments, a housing provides a port-of-entry for a device (e.g. light) into an object or apparatus (e.g. seating). In some embodiments, a housing provides a means for concealing a device within an apparatus. In some embodiments, a housing provides a means for concealing a device (e.g., a cover) when in it is stowed or fully retracted. In some embodiments, a cover is a portion of, or integrated into a portion of an object or apparatus (e.g. seating (e.g. arm rest, head rest, console, etc.)). In some embodiments, a cover holds a device in a concealed or retracted configuration. In some embodiments, a device (e.g. light) is mounted within a piece of furniture and is activated upon removing and/or moving a cover to reveal the device (e.g. light). In some embodiments, a device (e.g. light) is mounted in a stationary fashion in a piece of furniture and is activated by lifting up and/or pulling down a cover (e.g., mounted in the center of a couch and the head rest area of the center section is flipped up exposing the light and turning it on). In some embodiments, a device (e.g. light) is inactive when concealed by a cover (e.g. lid, arm rest, seat cushion, panel, etc.), and is activated when the cover is moved to reveal the device (e.g. light). In some embodiments, a device (e.g. light) is stationary and/or moveable (e.g. extendable, retractable, bendable, etc.).

The invention is not limited by the location or means for mounting and/or integrating a device (e.g. light) in/on an object or apparatus (e.g. seating). In some embodiments, a device (e.g. light) is completely obscured from view when adopting a concealed and/or inactive conformation (e.g. concealed by a cover). In some embodiments, a device (e.g. light) is revealed and/or activated by extending the device (e.g. light) from a housing and/or its mounted location on an object or apparatus (e.g. seating (e.g. arm rest, head rest, console, car door, overhead console, dashboard, etc.)). In some embodiments, a device (e.g. light) is revealed and/or activated moving and/or removing a cover. In some embodiments, moving a cover that conceals a device (e.g. light) activates the device (e.g. light). In some embodiments, moving a cover to reveal a device (e.g. light) allows the device to be extended (e.g. automatically or manually). In some embodiments, a cover comprises a portion of the object or apparatus within which the device (e.g. light) is mounted, for example, an arm rest top, seat cushion, head rest, console top, etc. In some embodiments, a portion of a device (e.g. light) is visible when in a concealed, retracted, and/or inactive configuration (e.g. to provide user-access to the device (e.g. to extend and/or activate the device).

In some embodiments, a housing is a stand-alone base. In some embodiments, a housing supports a device or apparatus. In some embodiments, a housing can be movably or fixedly attached to an abject. In some embodiments, a housing or base sits upon a surface without attachment thereto.

In some embodiments, a sensor and/or switching mechanism of the invention is configured to automatically activate and/or deactivate a device (e.g. light). In some embodiments, the sensor and/or switching mechanism is configured to function in response to changes in the conformation of the device (e.g. extended or retracted), and/or changes in the conformation of a cover for the device (e.g. open or closed). Such sensor and/or switch devices are described in detail in U.S. patent application Ser. No. 12/946,682, filed Nov. 15, 2010, herein incorporated by reference in its entirety for all purposes.

All publications and patents mentioned in the present application and/or listed below are herein incorporated by reference. Various modification, recombination, and variation of the described features and embodiments will be apparent to those skilled in the art without departing from the scope and spirit of the invention. Although specific embodiments have been described, it should be understood that the invention as claimed should not be unduly limited to such specific embodiments. Indeed, various modifications of the described modes and embodiments that are obvious to those skilled in the relevant fields are intended to be within the scope of the following claims.

We claim:

1. An apparatus comprising:
   (a) a housing, wherein the housing comprises ferromagnetic material;
   (b) a flexible support element, wherein said flexible support element has an elongate shape comprising proximal and distal ends, wherein said flexible support element extends through said housing and is moveable between a fully retracted position, a fully extended position, and intermediate positions;
   (c) a functional element connected to the distal end of said flexible support element; and
   (d) a magnet located at the proximal end of said flexible support element;
   wherein the distal end of the flexible support element is within, or adjacent to, the housing when the flexible support element is in the fully retracted position;
   wherein the proximal end of the flexible support element and the magnet located thereat are within the housing when the flexible support element is in the fully extended position;
   wherein the magnet located at the proximal end of said flexible support element is in contact with the housing only when said flexible support element is in the fully extended position and an attractive magnetic force between the magnet located at the proximal end of said flexible support element and the ferromagnetic material of the housing maintains the position of the flexible support element in the fully extended position; and
   wherein the magnet located at the proximal end of said flexible support element is not in contact with the housing when said flexible support element is in the fully retracted position and intermediate positions.

2. The apparatus of claim 1, wherein the ferromagnetic material of said housing comprises a housing magnet that interacts with said magnet located at the proximal end of said flexible support element when said flexible support element is fully extended.

3. The apparatus of claim 1, wherein said functional element is selected from the group consisting of a light fixture, a reading light, an air freshener, a speaker, a microphone, a mirror, a device holder, a remote control, a picture frame, a notepad, a drink holder, a book holder, and a fan.

4. The apparatus of claim 1, wherein said support element further comprises an electrical connection between said functional element and a power source.

5. The apparatus of claim 1, wherein said housing comprises a free-standing base.

6. The apparatus of claim 1 wherein said housing is configured for mounting said apparatus on and/or in an object.

7. The apparatus of claim 6, wherein said object is selected from the group consisting of furniture, theater seating, conference seating, wheelchair, hospital bed, a wall, a car, an ambulance, a boat, a plane, a train, and medical equipment.

8. The apparatus of claim 1, wherein said housing is configured for mounting said apparatus into the arm rest, back rest, side, top, or console of a seating element.

9. The apparatus of claim 8, wherein said seating element is selected from the group consisting of lounge chair, theater seating, a vehicle seat, a hospital bed, wheelchair, ambulance, and a couch.

10. The apparatus of claim 1, wherein fully retracting said support element into said housing places said functional element within or adjacent to said housing.

11. The apparatus of claim 1, wherein said flexible support element is bendable, rotatable, or a combination thereof.

12. The apparatus of claim 1, wherein the force resulting from alignment of the permanent magnets of said housing with the magnetizable material of said support element is sufficient to resist the pull of gravity on said support element and said functional element.

13. The apparatus of claim 12, wherein said force is sufficient to resist forces caused by minor disturbances.

14. The apparatus of claim 1, wherein a force resulting from alignment of the magnet located at the proximal end of said flexible support element with said housing is sufficient to resist the pull of gravity on said flexible support element and said functional element.

* * * * *